BEST AVAILABLE COPY

185. MOTORS,
Horse power type,
Sweep.

Roberts & Throp. Sheet 1-2 Sheets.

Horse Power.

No. 3,763. Reissued Dec. 14, 1869.

Witnesses
Fred Artois
Theodore Lang

Inventors
Cyrus Roberts & John A. Throp
By J. Thomson Bell
Atty.

N. PETERS, PHOTO-LITHOGRAPHER, WASHINGTON, D. C.

185. MOTORS,
Horse power type.
~~Sweep~~.

Sheet 2-2 Sheets.

Roberts & Throp.

Horse Power.

No. 3,763.

Reissued Dec. 14. 1869.

Witnesses

Fred Artist,
Theodore Lang

Inventors

Cyrus Roberts & John A. Throp
by J. Snowden Bell Atty

N. PETERS, PHOTO-LITHOGRAPHER, WASHINGTON, D. C.

United States Patent Office.

CYRUS ROBERTS AND JOHN A. THROP, OF THREE RIVERS, MICHIGAN.

*Letters Patent No.* 84,766, *dated December* 8, 1868; *reissue No.* 3,763, *dated December* 14, 1869.

IMPROVED HORSE-POWER.

The Schedule referred to in these Letters Patent and making part of the same.

*To all whom it may concern:*

Be it known that we, CYRUS ROBERTS and JOHN A. THROP, both of Three Rivers, in the county of St. Joseph, and State of Michigan, have invented a new and useful Combined Horse-Power and Truck, of which the following is a full, clear, and exact description, reference being had to the accompanying drawings, which make part of this specification, and in which—

Figure 1:
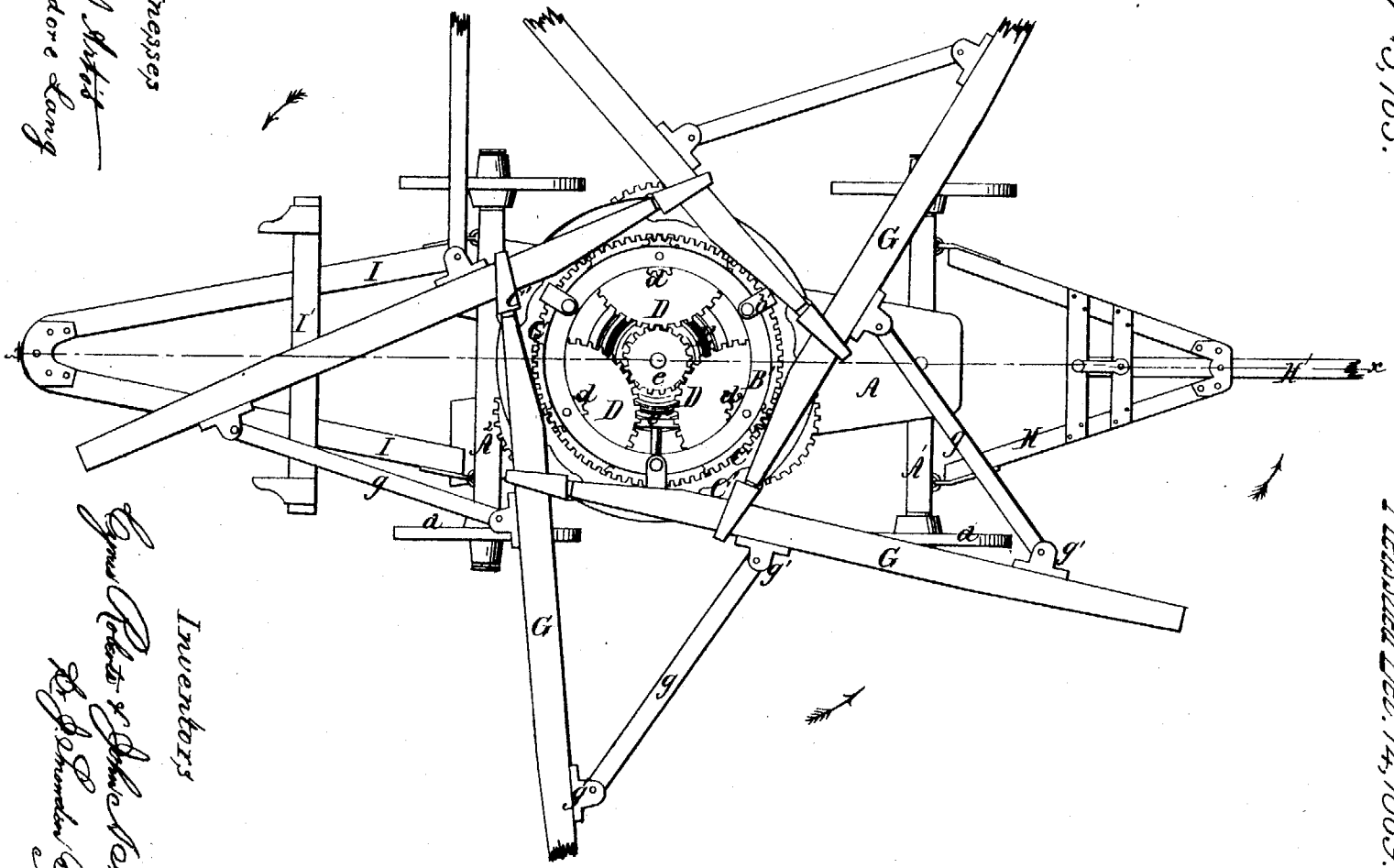
Figure 2:
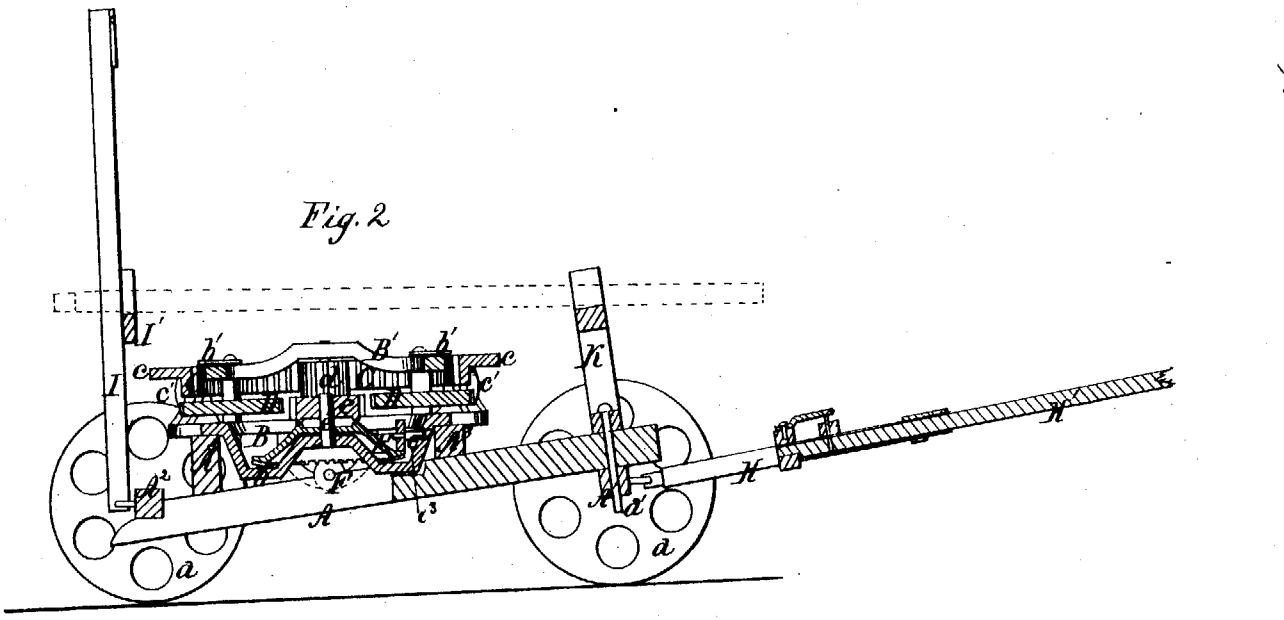
Figure 3:
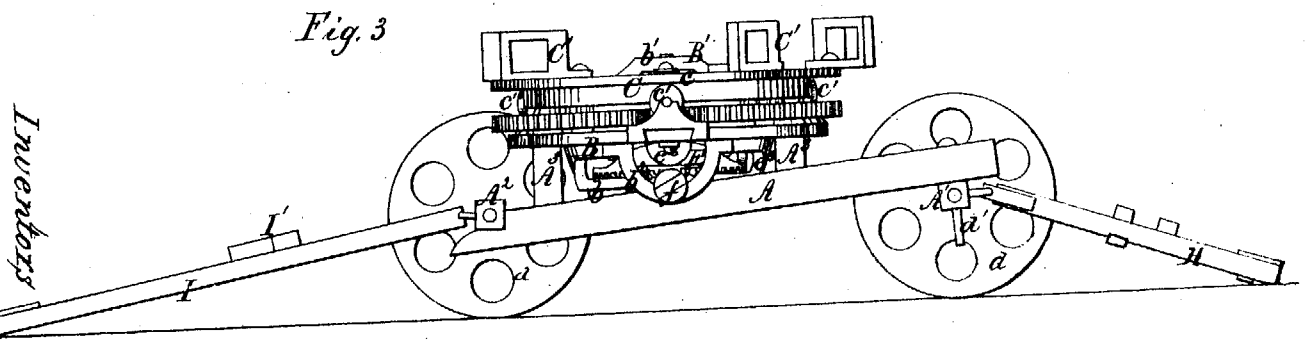

Figure 1 represents a plan or top view of our improved machine;

Figure 2, a vertical longitudinal section through the same, at the line *x x* of fig. 1, the parts being shown in position for transportation; and Figure 3, a side elevation of the same, in position for operation, the levers and the wheels on the near side being removed, to show its construction more clearly.

Our improvements relate to that class of horse-powers which is arranged upon wheels for transportation from place to place; and The object of our invention is to provide improved means of applying power to the same, and transmitting it to the machinery to be driven, as well as to construct a compact, strong, and convenient machine, which can readily be transported from place to place, and be operated without detachment from its wheels.

The improvements herein claimed consist—

First, in a novel construction and arrangement of the frame of the truck, and the bed-plate which carries the gearing, whereby increased strength and convenience of access to the parts are insured, and convenient arrangements for transporting the levers, braces, &c., provided.

Second, in a novel and improved arrangement of braces, in connection with the levers to which the horses are attached, whereby the strain upon them, when in operation, is equalized and made uniform upon all, and liability of breakage obviated.

Third, in a novel and improved arrangement of the bevel-wheel which gears with the pinion upon the line-shaft, whereby the latter may be brought nearer to the ground, and friction-rollers of larger diameter placed over the bevel-wheel, to prevent the same from being lifted when in gear with the pinion.

Fourth, in a novel construction and arrangement of the bevel-wheel, and its clutch, with the friction-rollers, which keep the wheel level when at work.

Fifth, in combining a master-wheel without a centre, and running on friction-rollers, with guides mounted on a fixed ring or bed-plate, to hold the master-wheel properly to its work.

Sixth, in arranging the hangers, which support the bearings of the line-shaft, upon the outside of the bed-plate and above the frame, whereby the bearings can be placed at the greatest possible distance apart, and a grease-cup may be formed upon the frame for the bevel-pinion to work in, as hereinafter more fully set forth.

In the accompanying drawings, which show a convenient arrangement of parts for carrying out the objects of our invention, our horse-power is represented as permanently secured to a four-wheeled truck, which is composed of an angular or V-shaped frame, A, having transverse bolsters $A^3$, to which the bed-plate of the horse-power is firmly fastened, and supported upon the front and rear axles $A^1$ $A^2$ and wheels *a*.

The frame A is narrowest at its forward end, near which it is pivoted to the front axle $A^1$ by a king-bolt, *a'*, so as to enable the front wheels and axle to be turned in either direction when in transportation.

The tongue H', by which the machine is drawn, is connected to an angular frame, H, pivoted to the front axle.

A similar frame, I, is pivoted to the rear of the frame A, and is provided with a transverse bolster, I'. When the horse-power is to be transported, a rectangular frame, fig. 2, is placed upon the front of the main frame A, and held in upright position by the king-bolt *a'*, or by bolts or clamps.

The rear hinged frame I is then turned up vertically, as shown in fig. 2, and the levers, braces, &c., placed upon its transverse bolster I', and the upper bar of the frame K. When properly secured in this position by chains, or otherwise, they are safely and conveniently carried from place to place.

The side bars and upper bar of the frame K are preferably so constructed as to be removed from and replaced at pleasure upon the lower bar thereof, which can remain in position, confined by the king-bolt, during the operation of the horse-power.

The operative mechanism of the horse-power is supported upon an annular metallic bed-plate, B, firmly secured upon the transverse braces $A^3$ of the truck.

An annular master-wheel or primary gear, C, having internal teeth, and provided with an outwardly-projecting rim or flange, *c*, is supported upon friction-rollers *c'*, which are mounted in bearings upon the top of the bed-plate, and upon which the rim or flange *c* rests. We are aware that master-wheels without a centre have been supported upon friction-rollers.

By our arrangement of the projecting rim, we are enabled to employ rollers of much greater diameter without altering the level of the bed-plate, and they are readily accessible for purposes of renewal or repair when required.

A ring, $B^1$, is connected by short studs and shafts to the bed-plate B, and has secured to its top, guide-plates $b^1$, which prevent the annular wheel C from being lifted or displaced when in operation. As the wheel has no spokes or hub, this is important.

Sockets or staples C' are secured upon the upper surface of the master-wheel C, near its periphery, in which are inserted the sweeps or levers G, to which the horses are attached to operate the power. Each socket receives the inner end of one lever, and the preceding lever passes through it adjacent thereto, the levers being arranged in form of a polygon, with extended sides, as shown in fig. 1 of the drawings.

In order to distribute and equalize the power exerted by the different horses, we employ diagonal braces *g*, connecting the levers. The braces are arranged in such manner that the forward end of each brace, or that end which is in advance when the machine is in operation, (the horses travelling in the direction of the arrows of fig. 1,) is connected to the sweep in advance of it, outside of the socket through which the said sweep or lever passes, and consequently outside of the end of the next sweep which is inserted in that socket.

By this arrangement it will be seen that each brace pulls upon the sweep to which its back end is connected, and pushes upon that to which its forward end is connected, exerting a leverage thereon equal to the distance from its point of attachment to the socket, and tending to resist liability to breakage of the levers.

We are aware that the sweeps of horse-powers have been heretofore united by diagonal braces, but, as constructed, the leading ends of the latter have been connected to the sweep in advance, on a line with or inside of the socket through which the lever or sweep passes, and therefore losing the advantage of leverage made available by our arrangement.

The inner wheel C gears with pinions *d*, cast in a piece with, or secured to spur-wheels D, rotating upon shafts connecting the bed-plate B and ring $B^1$.

The spur-wheels D in turn gear with a pinion, *e*, united by a clutch to a bevel-wheel, E, both the wheel and pinion rotating upon a shaft, $e^1$, secured in a brace, *b*, below the bed-plate, and cast in a piece therewith.

The bevel-wheel E is of dished or conical form, and extended downward below the bed-plate, so that its toothed rim shall gear with a pinion upon a line-shaft, F, supported in bearings in hangers $b^2$, upon the outside of the bed-plate, and extending downward toward the frame A, which is recessed to admit them.

Couplings *f* are secured upon the ends of the line-shaft F, to which tumbling-rods may be connected for the purpose of transmitting power to the machinery to be driven.

We are aware that bevel-wheels of this construction are not new in mechanics, but the arrangement of the same, with relation to the bed-plates and frame of the truck, constitutes a novel and valuable improvement, whereby we are enabled to bring the line-shaft much nearer to the ground than has been heretofore done in horse-powers, for the purpose of reducing the angle of the tumbling-rods, and making the position of the same such that the horses can conveniently walk over them when operating the power.

By our arrangement of the hangers upon the outside of the bed-plate, we are enabled to place the bearings of the line-shaft at the greatest possible distance apart, and render the same conveniently accessible for oiling and repair.

In order to prevent the bevel-wheel E, which, as before stated, is connected by a clutch with the spur-pinion *e*, above it, from being lifted or getting out of line with the pinion of the line-shaft when in operation, we provide friction-rollers $e^2$ $e^3$, which are mounted upon shafts secured to the bed-plate, and rotate upon the upper surface of the bevel-wheel, near its periphery. The roller $e^2$ is placed at a point immediately above the pinion of the line-shaft, and the roller $e^3$ at right angles thereto, or nearly so.

By this arrangement the bevel-wheel is maintained truly in line when in operation, and injurious wear of the gearing, which would be caused by its sagging or moving out of place, prevented.

When ready for operation, the truck is to be suitable secured in position by chains, stakes, &c., so as to prevent its displacement.

The operation of the machine will be readily understood from the foregoing description, the horses moving in the direction of the arrows.

What we claim as new, and desire to secure by Letters Patent, is—

1. The combination of a V-shaped truck-frame, and its transverse bolsters, with the bed-plate and gearing, the whole constructed for joint operation, substantially as set forth.

2. The combination, with the sweeps, of the diagonal braces, having their leading ends respectively connected with the sweeps, in advance thereof, at points outside of the sockets through which said sweeps pass, all constructed for joint operation substantially as set forth.

3. The combination of the line-shaft, the bed-plate, and the dished bevel-wheel, arranged below the bed-plate, all constructed for joint operation, substantially as set forth.

4. The combination of the bevel-wheel, united by the clutch to the pinion above it, the friction-roller rotating upon the upper surface of the wheel, above the pinion of the line-shaft, and the friction-roller at right angles thereto, all these parts being constructed to operate as set forth.

5. The combination of the annular master-wheel, the friction-rollers, the fixed bed-plates, and the guides, all these parts being constructed to operate as set forth.

6. The arrangement of the frame, the bed-plate, the line-shaft, and the hangers $B^2$, constructed as described.

CYRUS ROBERTS.
JOHN A. THROP.

Witnesses:
JNO. S. MAUREY,
E. H. LOTHROP.